United States Patent [19]

Hansen et al.

[11] Patent Number: 5,322,324
[45] Date of Patent: Jun. 21, 1994

[54] COVER FOR AN INFLATABLE AIR BAG HOUSING

[75] Inventors: Scott L. Hansen, Huntsville, Utah; Makoto Kan, Wako, Japan; Hitoshi Higuchi, Wako, Japan; Iwao Imaizumi, Wako, Japan; Gene Shope, East Rochester, N.H.; James R. Pritchard, Somersworth, N.H.; Alan Choiniere, Stratham, N.H.

[73] Assignees: Morton International, Inc., Chicago, Ill.; Honda Giken Kogyo Kabushiki Kaisha, Tokyo, Japan; Davidson Technology Center, Dover, N.H.

[21] Appl. No.: 101,609

[22] Filed: Aug. 3, 1993

[51] Int. Cl.⁵ .................................... B60R 21/08
[52] U.S. Cl. ............................ 280/732; 280/731; 280/743 R
[58] Field of Search ............... 280/728, 731, 732, 743

[56] References Cited

U.S. PATENT DOCUMENTS

| | | | |
|---|---|---|---|
| 5,082,310 | 1/1992 | Bauer | 280/732 |
| 5,125,683 | 6/1992 | Nakajima | 280/731 |
| 5,158,322 | 10/1992 | Sun | 280/732 |

*Primary Examiner*—Kenneth R. Rice
*Attorney, Agent, or Firm*—Mason, Kolehmainen, Rathburn & Wyss

[57] ABSTRACT

A cover for an inflatable air bag housing is formed of integrally molded resinous plastic material and defined therein is a hinge area and a thin fracture line forming a door which pivots to an open position upon fracture of the cover along the fracture line when an air bag is inflated. A metal reinforcing element is embedded in the resinous plastic material and includes segments diverging and below the hinge area forming an open space or void which is filled in with a low density collapsible, energy absorbing, rigid foam which exhibits minimal spring back. The filler helps prevent sagging or read-through of the cover above the void when prolonged exposure to heat and sun is experienced. Moreover, the foam filler absorbs energy during bag deployment and aids in preventing plastic resin from leaking into the void space during the initial fabrication of the cover as the metal reinforcement element is molded in place.

20 Claims, 2 Drawing Sheets

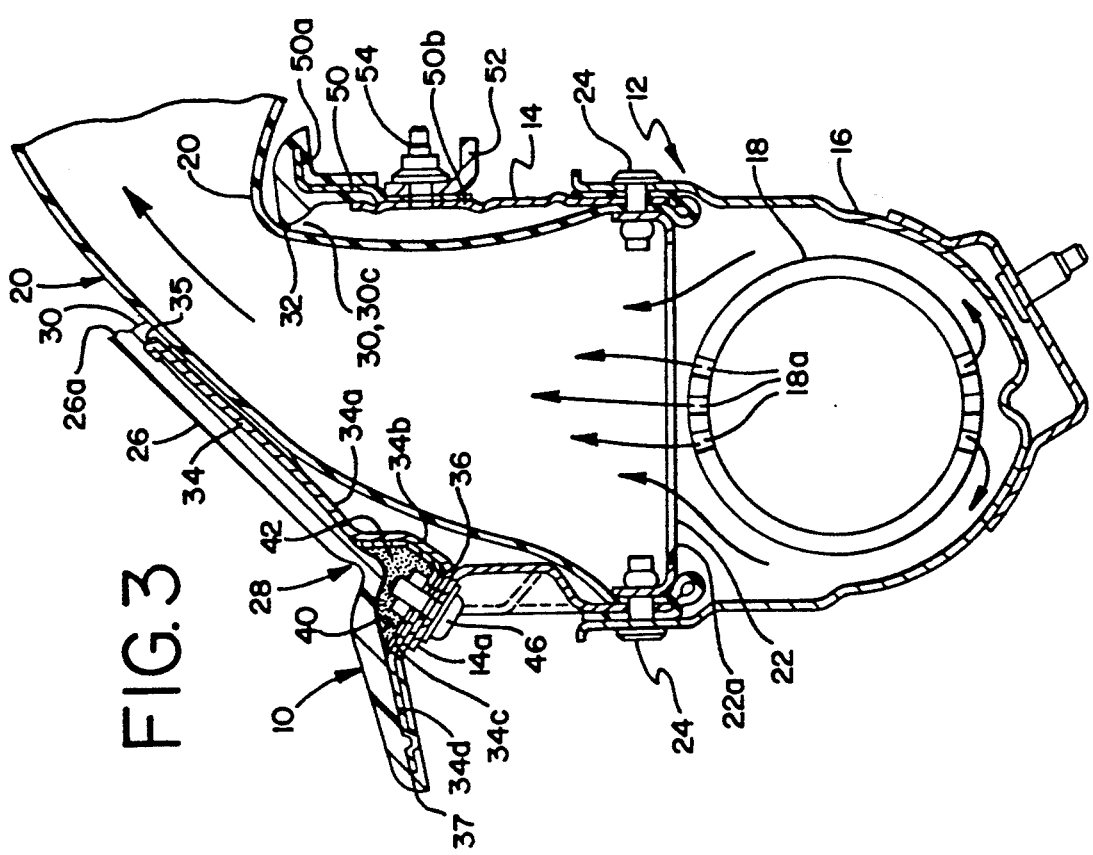

COVER FOR AN INFLATABLE AIR BAG HOUSING

BACKGROUND OF THE INVENTION

1. Field of the Invention

The present invention relates to a new and improved cover for an inflatable air bag housing formed of resinous plastic material and reinforced so as to be positively retained when a door portion is opened by fracture along a grooved fracture line.

2. Background of the Prior Art

Prior art covers for inflatable air bag housings have been formed of resinous plastic material with metal reinforcement elements therein. When the cover is fractured along a grooved fracture line, a door portion can open up to let the expanding air bag out of the housing. It is desirable that both the reinforcing element and the cover itself in a hinge area be capable of pivoting without requiring excessive force yet strong enough to retain the open door attached to the rest of the cover after opening has occurred. Prior art devices have provided an air filled void area between portions of a metal reinforcing element and the molded plastic material of the cover in the region of the hinge line. One problem with these types of prior art devices is that the plastic material of the cover begins to sag or read through over the void due to prolonged heat and sun exposure. Sometimes molding resin leaks into the void making it more difficult for the door panel to be opened upon air bag inflation.

OBJECTS OF THE INVENTION

It is an object of the present invention to provide a new and improved cover having a collapsible foam filled void or open area formed along a hinge line between a molded resinous plastic portion of the cover and a metal reinforcing element so as to permit a door panel to pivot open when a fracture occurs during air bag inflation.

Another object of the invention is to provide a new and improved cover of the character described employing a cellular foam filler in the open space or void as previously referred to, which foam does not substantially increase the amount of opening force required, and which foam prevents sagging or read through of the molded plastic material above the void space even after prolonged exposure to sun and heat.

In addition, it is another object of the present invention to provide a new and improved cover of the character described in which a low density cellular foam filler is utilized in the hinge area between a portion of the molded plastic cover and a metal reinforcing therebelow that is capable of absorbing energy expended during the opening force applied to fracture the panel along a predetermined fracture line providing a door that pivots open to accommodate a rapidly inflating air bag.

Still another object of the present invention is to provide a new and improved cover of the character described which eliminates sag and surface read-through caused by heat and sun exposure in a hinge area and which eliminates the problem of molded plastic material leaking into a void or open space that is provided between the plastic cover and a metal reinforcing element therein.

BRIEF SUMMARY OF THE PRESENT INVENTION

The foregoing and other objects of the present invention are accomplished in an illustrative embodiment thereof comprising a cover for an inflatable air bag housing formed of molded resinous plastic material and including an integrally formed door defined by a fracture line and a hinge area. The hinge area is adapted to permit pivotal movement of the door to an open position upon fracture of the cover along the fracture line when the air bag is inflated. A metal reinforcing element is embedded in the molded plastic panel and a portion of the element is spaced apart below the hinge area to form an open space or void directly behind the hinge area. A filler in the form of collapsible, low density, cellular plastic foam is filled into the open space or void for supporting the cover against read-through or sagging because of prolonged exposure to heat and sun. The foam filler is also useful during fabrication of the cover for preventing the leakage of plastic resin into the void.

BRIEF DESCRIPTION OF THE DRAWINGS

For a better understanding of the present invention, reference should be had to the following detailed description taken in conjunction with the drawings, in which:

FIG. 3 is a transverse cross-sectional view of the cover similar to FIG. 2 but illustrating a door in an open position after an air bag in the housing has inflated; and FIG. 4 is a transverse cross-sectional view similar to FIG. 3 illustrating a prior art cover.

DETAILED DESCRIPTION OF A PREFERRED EMBODIMENT OF THE INVENTION

Figure 1:
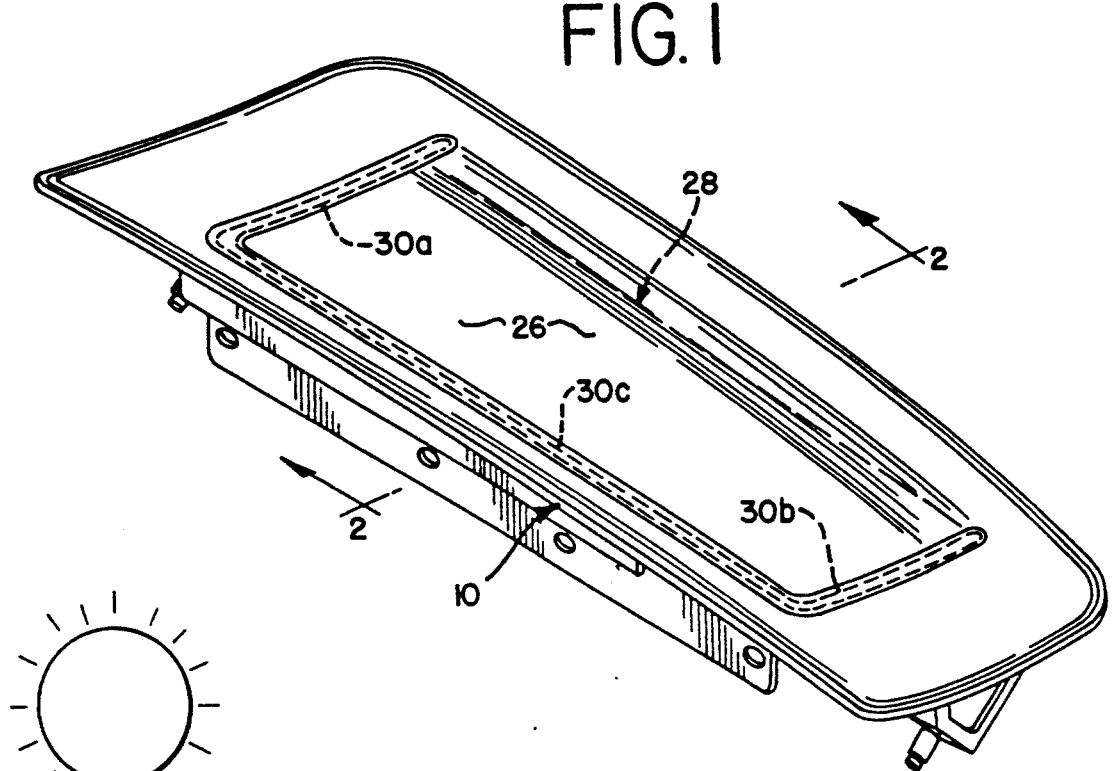
FIG. 1 is a top perspective view of a new and improved cover for an inflatable air bag housing constructed in accordance with the features of the present invention.
Figure 2:
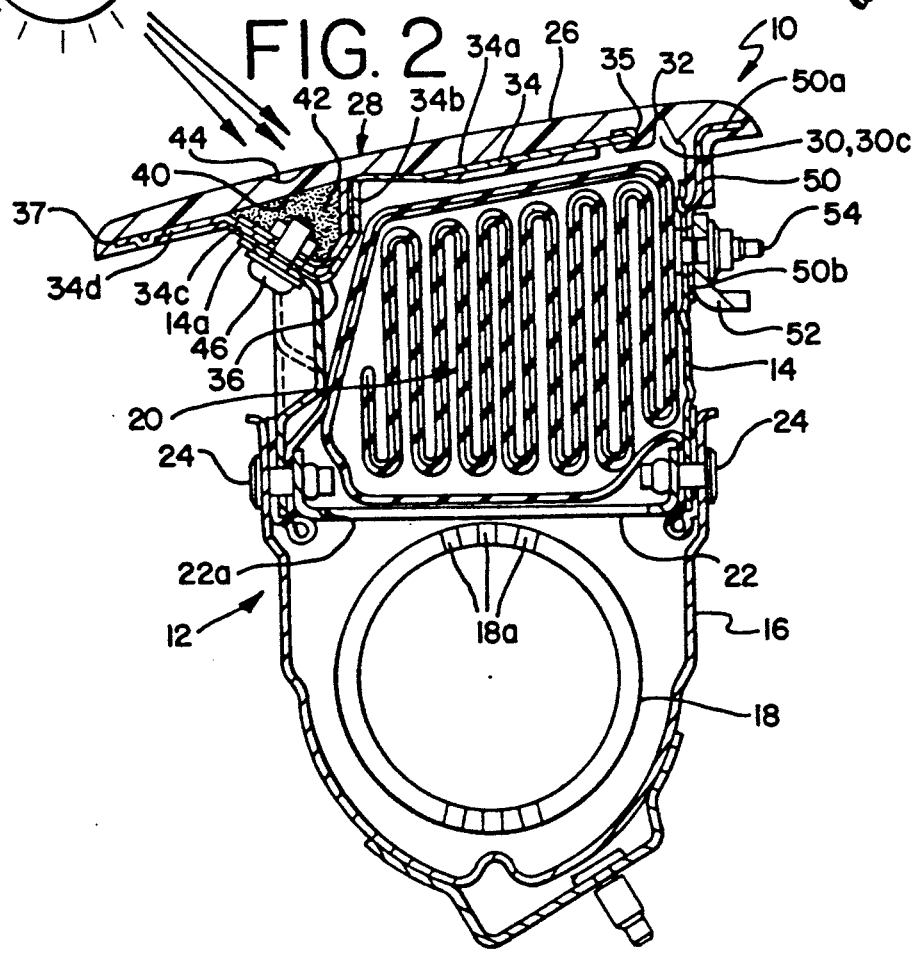
FIG. 2 is a transverse cross-section taken substantially along lines 2—2 of FIG. 1 showing the cover in a closed position.

Referring now more particularly to the drawings, in FIG. 1 is illustrated a new and improved cover for an inflatable air bag housing referred to generally by the reference numeral 10 and constructed in accordance with the features of the present invention. The cover 10 is adapted to rest upon the upper surface of a deck above the instrument panel or dashboard of a motor vehicle. The cover 10 seals and closes off the upper end of a housing 12 containing an air bag module which is positioned beneath the deck of the vehicle. The housing 12 includes an upper or first compartment 14 and a lower or second compartment 16 joined thereto. The lower compartment is adapted to hold an air bag inflator assembly including a cylinder 18 having ports 18a for permitting escaping gas to move out and upwardly into the upper compartment 14 to inflate an air bag 20 initially contained therein in deflated condition as shown in FIG. 2. The housing 12 is provided with a divider panel 22 for strengthening the middle portion thereof and this panel includes a plurality of slots or openings 22a to permit rapid movement of the released gas from the cylinder 18 to pass into the open lower end of the air bag 20 which is secured in place around a mid portion of the housing 12 by a single row or set of spaced apart fasteners such as rivets 24 as shown.

As more fully described in the aforementioned copending application, the compartmented housing 12 is extremely strong, yet lightweight and relatively small in size. In accordance with the present invention, the molded plastic cover 10 includes a central door portion 26 adapted to pivot upwardly from a closed position as shown in FIGS. 1 and 2 to an open position as shown in FIG. 3. Pivoting action takes place along an elongated hinge line or region 28 when the air bag 20 in the upper compartment 14 is rapidly inflated by the discharge of gas. In order to facilitate opening of the door 26, the panel cover 10 is formed with a V-shaped groove 30 on the underside forming a thin wall section 32 which comprises a fracture line. After fracture, a free edge 26a of the door panel 26 is defined generally parallel and spaced apart from the hinge area 28. In addition to a main, longer portion 30c of the groove 30 that extends generally parallel to the hinge area 28, the groove also includes a pair of shorter, opposite end segments 30a and 30b. The short end segments 30a and 30b join the longer main segment 30c at right angles and project forwardly. The hinge area or line 28 extends between outer ends of the short groove segments 30a and 30b of the U-shaped groove 30. After the thin wall section 32 above the groove 30 is fractured by the pressure of the expanding air bag the door 26 pivots freely open from the closed position of FIG. 2 to the open position of FIG. 3 allowing the air bag 20 to rapidly inflate to protect an occupant in the vehicle.

In accordance with the invention, the cover 10 and integral door 26 are provided with a metal reinforcement element 34 embedded in the molded plastic material thereof. The element 34 includes a main portion 34a of generally rectangular shape and having an area somewhat less than the area of the door panel 26. The portion 34a terminates in a free edge 35 spaced from the groove position 30c along the fracture line 32. Adjacent the hinge area 28, the reinforcement element 34 includes a downwardly divergent segment 34b integrally joined with an upwardly divergent section 34c at an acute angle forming an apex 36 along the junction spaced below the hinge area 28 of the cover panel 10. At an upper edge, the segment 34c of the reinforcement element 34 is joined with a section 34d terminating a free edge 37 short of the left-hand edge of the cover 10 as shown in FIGS. 1 and 3. The angularly divergent sections 34b and 34c of the reinforcement element together define the outline of an elongated void or open space 40 having a generally triangular shaped transverse cross-section. An upper wall of the void or open space 40 is defined by the underside of the cover panel 10, the metal segments 34b and 34c define the other two walls.

In accordance with the present invention, the open space or void 40 is filled with a low density, predominantly open celled, water blown rigid polyurethane foam which exhibits minimal spring back or hysteresis characteristics. Examples of such foams are Davisorb EM-1090 from Davidson/Textron and Bayfil EA-F20 supplied by Miles Chemical, Inc. The foam solidifies into a filler 42 which aids in preventing the entry of urethane resin of the cover 10 from entering the void 40 during the fabrication of the panel in the molding process. The foam material 42 within the void 40 provides low or little resistance to opening and helps to prevent sag or read-through as (indicated in FIG. 2 by the area 44) above the void space 40 often caused by prolonged exposure to heat and sun. The foam filler 42 has a density of approximately 1.5 lbs. per cubic foot and crushes or collapses at a relatively constant rate as it is compressed between 0% to 70% of original volume. When set, the foam filler 42 is rigid enough to keep molding resin out of the void space 40 and yet the filler 42 will crush or collapse at a relatively constant rate as door opening occurs.

In prior art covers (FIG. 4) long exposure to heat and sun loading under the windshield of a car often times resulted in a sag of the urethane resin of the panel into the unfilled void or open space 140. Preferably the foam filler 42 is formed of EA type cellular material which collapses with a characteristic of constant force versus flexion as the door 26 moves from the closed to open position during expansion of an inflating air bag 20. As illustrated in FIG. 3 the collapsing foam 42 in the void space 40 permits pivotal movement of the door 26 to occur with little danger of a fracture along the hinge line or area 28. A relatively sharp angle is formed at the junction of the upper edge of the segment 34b of the metal stiffener 34 and the main body portion 34a thereof so that the metal element may readily pivot along this junction directly below the hinge line area 28 in the plastic resin of the cover 10. Pivoting of the stiffening element along this junction does not result in fracture of the metal element 34 which remains intact and positively retains the door 26 after severance along the thin wall fracture line 32 defined above the groove segments 30a, 30b, and 30c.

The metal stiffening element 34 is positively secured to an elongated metal angular flange 14a along an upper edge portion of the upper compartment 14 by a plurality of rivets 46, which may be of the pop rivet type and which can easily penetrate into the foam 42 contained within the open space or void 40.

It will thus be seen that the metal stiffening or reinforcement element 34 that is molded in place within the resinous plastic material of the cover 10 functions to add stiffness and strength and helps to positively retain the door 26 from breaking away completely upon opening. The cover 10 also includes another stiffening element 50 of angular cross-sectional shape having an upper flange 50a embedded in a rearwardly extended portion of the cover 10. A downwardly extending segment 50b of the angular stiffening member 50 is secured to an upper portion of the wall of the upper compartment 14 and to a stiffening angle 52 by means of a plurality of fasteners such as rivets 54.

It will thus be seen that the new improved cover 10 in accordance with the present invention provides for an improved molding process during initial fabrication and eliminates the problems of sag or read-through in the upper surface of the panel due to prolonged exposure to heat and sun. Moreover, the collapsible foam filler 42 absorbs energy during the door opening process as it collapses and offer a substantially constant amount of resistance to door opening pressure.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A cover for an inflatable air bag housing formed of resinous plastic material, including:

an integral door defined in said cover by a thin fracture line and a hinge area, said hinge area adapted to permit pivotal movement of said door to an open position upon fracture of said cover along said fracture line when said air bag is inflated;

reinforcement means embedded in said door and a portion of said cover adjacent to and outside of said hinge area, said reinforcement means including a segment spaced apart behind said hinge area forming an open space below an upper surface of said cover extending along said hinge area; and filler means in said open space for supporting said upper surface of said cover against sagging due to heat in a region adjacent said open space above said segment of said reinforcement means.

2. The cover of claim 1, wherein:

said filler means comprises a low density, rigid polyurethane, energy absorbing foam, which exhibits minimal spring back or hysteresis characteristics.

3. The cover of claim 2, wherein:

said filler means is collapsible when said door is pivoted open upon inflation of said air bag.

4. The cover of claim 1, wherein:

said open space is defined between an underside of said cover and portions of said segment of said reinforcement means extending downwardly and away from said underside of said cover.

5. The cover of claim 4, wherein:

said portions of said segment of said reinforcement means join one another at an acute angle along an apex for permitting relative angular movement between said portions when said door is opened upon inflation of said air bag.

6. The cover of claim 5, wherein:

said open space is generally triangular in transverse cross-section.

7. The cover of claim 6, wherein;

said housing includes a side wall below said cover; and one of said portions of said segment of said reinforcement means is secured to said side wall.

8. The cover of claim 1, wherein:

said thin fracture line includes a portion parallel of said hinge area comprising a groove in an underside of said cover forming a thin wall thickness defining said fracture line.

9. The cover of claim 8, wherein:

said reinforcement means has a free edge spaced apart from said groove.

10. The cover of claim 9, wherein:

said reinforcement means includes a portion on an opposite side of said groove from said free edge.

11. A panel for an air bag housing formed of molded plastic material, including:

a door integrally formed in said panel and adapted to open upon inflation of said air bag, said door formed between a thin wall section of said panel providing a fracture line and an opposite hinge line parallel thereto;

a reinforcement element in said panel including a first segment in said door, a second segment in a flange portion of said panel on an opposite side of said hinge line from said door, and a V-shaped segment joined between said first and second segments having an apex in spaced parallel relation to said hinge line beneath an underside portion of said panel forming an open space; and filler means of cellular foam in said open space for preventing said molded plastic resin from filling said open space between said underside portion and facing surfaces of said V-shaped segment.

12. The panel of claim 11, wherein:

said V-shaped segment includes a pair of walls joined along said apex at a sharp angle forming two sides of said open space, and said underside portion of said panel forming a third side of said open space joining said other two sides.

13. The panel of claim 12, wherein:

said open space is generally triangular in cross-section transverse to said hinge line.

14. The panel of claim 13, wherein:

said filler means supports said underside portion of said panel to prevent sagging of said panel above said open space due to heating.

15. The panel of claim 14, wherein:

said filler means is collapsible, said door is pivoted open along said hinge line upon severance along said thin wall section by inflation of said air bag.

16. The panel of claim 12, wherein:

one of said pair of walls of said V-shaped segment of said reenforcement element is fixedly secured to a wall of said housing extending away from said 17. The panel of claim 16, wherein:

said thin wall section of said panel is defined by a groove in an underside of said panel in spaced parallel rotation with said hinge line.

18. The panel of claim 12, wherein:

said reinforcement element is pivotable along said apex when said door is pivoted to open about said hinge line by inflation of said air bag causing severance of said thin wall section of said panel.

19. The panel of claim 17, wherein:

said groove has an apex forming said thin wall section between an edge of said door and a panel flange extending away from said door edge.

20. The panel of claim 19, wherein:

said reinforcement element includes a portion embedded in said panel flange separate and apart from said first segment in said door.

* * * * *

UNITED STATES PATENT AND TRADEMARK OFFICE
CERTIFICATE OF CORRECTION

PATENT NO. : 5,322,324
DATED : June 21, 1994
INVENTOR(S) : Hansen et al.

It is certified that error appears in the above-identified patent and that said Letters Patent is hereby corrected as shown below:

Column 6, line 36, Following "away from said", insert --panel--.

Signed and Sealed this

Twenty-fifth Day of October, 1994

Attest:

BRUCE LEHMAN

Attesting Officer

Commissioner of Patents and Trademarks